3,773,849
VAPOR PHASE ISOPRENE PROCESS

John O. Turner, West Chester, Pa. (% Sun Oil Company, P.O. Box 426, Marcus Hook, Pa. 19061)
No Drawing. Continuation-in-part of abandoned application Ser. No. 197,964, Nov. 11, 1972. This application Apr. 17, 1972, Ser. No. 244,847
Int. Cl. C07c 1/20
U.S. Cl. 260—681                    11 Claims

ABSTRACT OF THE DISCLOSURE

Isoprene may be prepared in one step by reacting methylal with isobutene or butene-2 in the vapor phase in the presence of a catalyst comprising alumina treated with $BF_3$. The use of this catalyst provides higher yields and selectivities with longer catalyst lifetimes than like processes taught by the prior art.

CROSS-REFERENCE TO RELATED APPLICATION

This application is a continuation-in-part of U.S. Ser. No. 197,964, filed Nov. 11, 1971, in the name of John O. Turner, now abandoned.

BACKGROUND OF THE INVENTION

This invention relates to an improved process for the production of isoprene. More particularly, this process is directed to the vapor phase reaction of methylal with isobutene or butene-2 in the presence of a $BF_3$ catalyst to provide isoprene in high yields and selectivity. In a further embodiment, this invention also contemplates the use of metal salt co-catalysts which convert certain ether by-products to isoprene, thereby increasing the overall yield.

Japanese Pat. No. 19,082–1965, published Aug. 27, 1970, in the name of K. Kitawaki et al. and assigned to Idemitsu Kosan, describes a vapor phase reaction of methylal with isobutene to form isoprene and isoprene precursors wherein the catalyst employed is silica, alumina, acid clay, Group II or Group III metal oxides, or mixtures thereof with silica, alumina or the like, etc. This process, while it does produce some isoprene, is nevertheless characterized by very short catalyst lifetimes. Moreover, as shown in Example 1 below, the selectivity and conversion rate drops substantially after about 15 to 30 minutes when employing this prior art method.

SUMMARY OF THE INVENTION

It has now been found, in accordance with the present invention, that when there is employed as the catalyst in the aforedescribed process $BF_3$ on alumina, or like catalyst combinations as defined below, there are obtained, quite surprisingly, substantially longer catalyst lifetimes, together with higher conversion rates and selectivity than that obtained by the catalysts of the prior art process.

DESCRIPTION OF THE INVENTION

In accordance with the present process, the reaction of methylal with isobutene in the vapor phase is conveniently carried out by passing the two reactants over a catalyst bed at elevated temperatures of from 150 to 450° C., and preferably 250 to 350° C., at liquid hourly space velocities (LHSV) for the reaction mixture in the range of from about 0.1 to 25.0, and preferably 1.0 to 10.0, and recovering a product mixture containing a major amount of isoprene and a minor amount of the isoprene precursor, 4-methoxy-2-methylbutene-1. The isoprene may readily be recovered from this mixture by distillation.

The mole ratio of isobutene to methylal in the feed stream should advantageously be in the range of from about 2 to 20, and preferably about 6 to 10. Thus, although it is important that there be an excess of isobutene over methylal, a much smaller excess is necessary than is required by the Japanese prior art method, where ratios of at least fifteen are employed.

Although substantially pure isobutene is the preferred olefin reactant, other olefins such as butene-2 may also be employed. Alternatively, mixed $C_4$–$C_5$ hydrocarbons such as olefin and/or paraffin-containing refinery streams boiling in the range of about −10° C. to 40° C., and containing at least 5 to 10 percent isobutene and 0 to 20 percent butene-2 by weight, may be used as starting materials. One typical $C_4$–$C_5$ refinery stream which may thus be employed is made up of a hydrocarbon mixture comprising two or more of the compounds isobutene, n-butene-1, n-butane, trans-butene-2, cis-butene-2, isopentane, isopentene and the like. Thus, as a further advantage of this process, it has been found that the starting material need not be restricted to pure isobutene or butene-2, but rather a mixture of $C_4$–$C_5$ hydrocarbons containing isobutene and/or butene-2, as well as other olefins and/or paraffins, may be utilized. In such a case the methylal selectively reacts with the isobutene or butene-2 while the remaining olefins and paraffins present merely act as non-reactive diluents which do not hinder the reaction.

As described above, the preferred catalyst for this process is $BF_3$ impregnated on alumina. This catalyst may be prepared in accordance with the teachings of U.S. Pat. No. 2,939,890 wherein substantially anhydrous gamma- or theta-alumina is modified by contacting it with from about 2 to 100 percent by weight of said $BF_3$ based on the weight of the alumina. While theta- and gamma-alumina are preferred, it has been found that other substantially anhydrous inorganic oxides taught by the above patent may likewise be employed herein, as for example silica, titanium oxide, zirconium dioxide, chromia, zinc oxide, magnesia, calcium oxide or various silica- or alumina-oxide combinations, as long as said oxides form a heat-stable compound with the $BF_3$.

A particularly advantageous feature of the aforesaid $BF_3$ catalyst when employed in the process of this invention is the discovery that this catalyst may be readily reactivated in situ by simply introducing small amounts of $BF_3$ gas into the reaction zone. This may conveniently be achieved either by admixing small amounts of $BF_3$ intermittently or continuously with the reaction stream, or separately in an inert gas such as nitrogen.

The activity of the catalyst, and its degree of reactivation are readily determine by measuring the amount of 4-methoxy-2-methylbutene-1 precursor formed. Thus, as will be shown in the following examples, the ratio of isoprene to precursor at the outset of the reaction is a very high 18 to 1. If the catalyst is not reactivated, this ratio gradually falls off to about 1 to 1 after about ten hours. However, if at this or an earlier point in time small amounts of $BF_3$ are passed through the reaction zone, the ratio of isoprene to precursor is returned to nearly its original level. Moreover, the percentage conversion of methylal, which generally drops during this period from about 99 percent to 85 percent, is restored to its original level by this expedient. This reactivation treatment may be carried out several times until the catalyst fails to respond to the $BF_3$. At this time the catalyst may then be conveniently regenerated by heating it at high temperatures sufficient to burn off any residual coke, and thereafter, if necessary, reactivated with additional $BF_3$ to restore the weight percent of this material relative to the amount of alumina.

As taught in the aforementioned Japanese Pat. 19,082, the 4-methoxy-2-methylbutene-1, i.e. the isoprene precursor which is co-produced with isoprene in high amounts, is readily convertible to isoprene, and thus may be separated and recycled with the starting materials in order to increase the overall yield. Alternatively, and more advantageously, however, it has been found, as a further embodiment of this invention, that when a co-catalyst comprising copper phosphate or lead, magnesium, or barium sulfate is employed together with the principal catalyst, the amount of this precursor which is formed is substantially less than when the $BF_3$ catalyst alone is employed, i.e. 95 percent selectivity for the isoprene during the initial stages of the reaction when the co-catalyst is employed as against about 80 percent when the principal catalyst is used alone. British Pat. No. 673,547 teaches a similar reaction using metal salts in the presence of alumina. However, this reference makes no teaching or suggestion of the use of $BF_3$ in this reaction, or the use of this type of catalyst system in the reaction of methylal with isobutene to form isoprene.

The ratio of $BF_3$ catalyst to co-catalyst should desirably be in the range of about 1 to 25 percent by weight of co-catalyst based on the total weight of the catalyst mixture, and preferably about 2 to 8 percent by weight.

This invention will now be illustrated by the following examples. In considering these examples, a comparison of the results obtained in Example 1, which employs the catalyst taught by the Japanese patent, with the results obtained in Example 4, which employs applicant's catalyst, will clearly demonstrate the superiority of the latter over the former with respect to catalyst life and selectivity for the desired isoprene. Moreover, it will be seen from Examples 5, 6 and 10 that the addition of $MgSO_4$, $Cu_3(P_4)_2$ or $PbSO_4$ to the catalyst of Example 4 further improves the final yield, while the inclusion of small increments of $BF_3$ in the reactant feed stream (Example 7) serves to maintain the catalyst life and selectivity during the course of the reaction. Comparative Examples 2, 3 and 11 have been included to demonstrate that neither the alumina alone, the alumina with added metal salt alone, nor the $BF_3$ alone provides applicant's noted catalytic activity, but rather that the catalytic activity drops off rapidly, or, as in the case of $BF_3$ alone, is inoperative. Example 8 demonstrates applicant's novel process wherein varied reaction conditions and ratios are employed, while Example 9 demonstrates the use of silica magnesia as a support for $BF_3$ in place of alumina.

EXAMPLE 1

Into a vertical Pyrex tube fitted with an electric heater and containing 4 cc. of silica gel catalyst, is introduced methylal through a syringe pump and isobutene controlled through a flowmeter. The reaction is carried out with an isobutene:methylal ratio of 15:1 at 300° C. The isobutene is introduced at a rate of 25 liquid cc./hr. and the methylal is introduced at a rate of 1.5 cc./hr. over the 4.0 cc. of silica gel catalyst (LHSV=6.6; MHSV=80). The results obtained by this reaction are as follows:

| Time (minutes) | Conversion of methylal (percent) | Selectivity to— | |
|---|---|---|---|
| | | Isoprene (percent) | 4-methoxy-2-methylbutene-1 (percent) |
| 15 | 85 | 63 | 17 |
| 30 | 40 | 40 | 40 |

EXAMPLE 2

In accordance with the procedures of Example 1, isobutene and methylal are passed over 4.0 cc. of alumina at rates of 24 liquid cc./hr. and 1.5 cc./hr respectively, i.e. a mole ratio of isobutene:methylal of about 15 and LHSV of 66 The results are as follows:

| Time (hours) | Conversion of methylal (percent) | Selectivity to— | |
|---|---|---|---|
| | | Isoprene (percent) | 4-methoxy-2-methylbutene-1 (percent) |
| 1.5 | 96 | 32 | Trace |
| 2.5 | 59 | 23 | Trace |
| 3.5 | 14 | 13 | Trace |

EXAMPLE 3

In accordance with the procedures of Example 1, 24 cc./hr. of isobutene and 2.8 cc. of methylal are passed over a catalyst comprising alumina impregnated with 10 percent by weight of $MgSO_4$ (LHSV=9.0). The results are as follows:

| Time (hours) | Conversion of methylal (percent) | Selectivity to— | |
|---|---|---|---|
| | | Isoprene (percent) | 4-methoxy-2-methylbutene-1 (percent) |
| 1 | 47 | 39 | 0 |
| 2 | 29 | 31 | 11 |

EXAMPLE 4

In accordance with the procedures of Example 1, isobutene is added at 24 liquid cc./hr. and methylal at 1.5 cc./hr. at 300° C. over 4.0 cc. of alumina containing 6 percent by weight of $BF_3$ (LHSV=6.6; mole ratio of isobutene:methylal is 15). The results are as follows:

| Time (hours) | Conversion of methylal (percent) | Selectivity to— | |
|---|---|---|---|
| | | Isoprene (percent) | 4-methoxy-2-methylbutene-1 (percent) |
| 2 | 99 | 80 | 5 |
| 5 | 99 | 82 | 7 |
| 10 | 99 | 50 | 40 |

EXAMPLE 5

The procedures of Example 4 are repeated except that the $BF_3$-on-alumina catalyst contains additionally 5 percent by weight of $MgSO_4$.

After 10 hours at the conversion is 99 percent and the selectivity to isoprene and 4-methoxy-2-methylbutene-1 respectively are 80 percent and 6 percent.

EXAMPLE 6

The procedures of Example 5 are repeated except that 10 percent $Cu_3(PO_4)_2$ by weight is substituted for the $MgSO_4$.

After 10 hours the conversion is 95 percent and the selectivity to isoprene and 4-methoxy-2-methylbutene-1 respectively are 75 percent and 9 percent.

EXAMPLE 7

The procedures of Example 3 are repeated except that the methylal reactant contains additionally 1 percent by weight of $BF_3$.

After 15 hours the conversion is 99 percent and the selectivity to isoprene and 4-methoxy-2-methylbutene-1 are respectively 60 percent and 25 percent.

EXAMPLE 8

The procedures of Example 7 are repeated except that the charge of reactants is 5.8 cc./hr. of isobutene and 1.5 cc./hr. of methylal (LHSV=18; mole ratio of isobutene:methylal=2).

After 10 hours the conversion is 95 percent and the selectivity to isoprene and 4-methoxy-2-methylbutene-1 is respectively 75 percent and 15 percent.

After 12 hours the conversion is 85 percent and the selectivity to isoprene and 4-methoxy-2-methylbutene-1 is 50 percent and 35 percent, respectively.

EXAMPLE 9

In accordance with the procedures of Example 4, isobutene is added at 24.0 cc./hr. and methylal at 2.8 cc./hr.

at 300° C. over silica-magnesia containing 5 percent $BF_3$ (LHSV=6.6). The results are as follows:

| Time (hours) | Conversion of methylal (percent) | Selectivity to— | |
|---|---|---|---|
| | | Isoprene (percent) | 4-methoxy-2-methylbutene-1 (percent) |
| 2 | 99 | 76 | 7 |
| 5 | 99 | 78 | 7 |

EXAMPLE 10

The procedures of Example 5 are repeated except that 20 percent lead sulfate is substituted for the magnesium sulfate.

After 10 hours the conversion is 99 percent and the selectivity to isoprene and 4-methoxy-2-methylbutene-1 are a combined 83 percent.

EXAMPLE 11

In accordance with the procedures of Example 4, $BF_3$ is used without alumina or any other solid catalyst by carrying out the reaction in a closed system at 150° C. and a pressure of 180 lbs./in.² The reaction forms a black viscous material which resembles a polymer.

When carried out at 0° C., the major product is 1,3-dimethoxy-3-methylbutene.

EXAMPLE 12

In accordance with the procedures of Example 1, a mixed $C_4$-$C_5$ olefin- and paraffin-containing refinery stream containing 12 percent isobutene is added at 24 liquid cc./hr. and methylal at 1.5 cc./hr. at 300° C. over 40 cc of alumina containing 6 percent $BF_3$ (LHSV= 6.6; mole ratio isobutene:methylal is 2).

After 10 hours the conversion of methylal is 70 percent and the selectivity to isoprene and 4-methoxy-2-methylbutene-1 is 65 percent and 7 percent, respectively. The remaining constituents of the refinery stream, other than isobutene, are recovered substantially unchanged.

EXAMPLE 13

The procedure of Example 12 is repeated except that a hydrocarbon stream containing 50 percent isobutene and 50 percent isobutane is substituted for the $C_4$-$C_5$ refinery stream. (LHSV=6.6; mole ratio of isobutene:methylal is 8.)

After 10 hours the conversion of methylal is 95 percent and the selectivity to isoprene and 4-methoxy-2-methylbutene-1 is 73 percent and 13 percent, respectively. The isobutane is recovered unchanged.

EXAMPLE 14

In accordance with the procedures of Example 4, but substituting butene-2 for isobutene, methylal (1.5 cc./hr.) and butene-2 (24 liquid cc./hr.) are passed over 4 cc. of alumina containing 6 percent $BF_3$ (LHSV=6.6; mole ratio of butene-2:methylal is 15), at 300° C.

After 8 hours, the conversion is 50 percent and the selectivity to isoprene and 4-methoxy-2-methylbutene-1 combined was 60 percent.

EXAMPLE 15

In accordance with the procedures of Example 4, but substituting silica-magnesia and silica-alumina, respectively, for alumina as a support for the $BF_3$, there are obtained after 8 hours the following results:

| Selectivity to— | | | | | |
|---|---|---|---|---|---|
| Methylal (percent) | | Isoprene (percent) | | 4-methoxy-2-methylbutene-1 (percent) | |
| Si-Al | Si-Mg | Si-Al | Si-Mg | Si-Al | Si-Mg |
| 99 | 98 | 74 | 71 | 8 | 11 |

What is claimed is:

1. In a process for the production of isoprene by the vapor phase reaction of methylal with isobutene, butene-2, or mixtures thereof, in the presence of a solid catalyst the improvement which comprises employing as the catalyst $BF_3$ on a suitable anhydrous inorganic oxide.

2. The process according to claim 1 wherein a $C_4$–$C_5$ olefin-paraffin hydrocarbon mixture containing at least 5 percent by weight of isobutene and from 0 to 20 percent of butene-2 is reacted with methylal.

3. The process according to claim 1 wherein the catalyst is $BF_3$ on alumina, wherein the amount of $BF_3$ present is at least 2 weight percent based on the weight of the alumina.

4. The process according to claim 1 wherein methylal and isobutene are passed over the catalyst at a liquid hourly space velocity of from about 0.1 to 25.0.

5. The process according to claim 4 wherein the liquid hourly space velocity is from about 1.0 to 10.0.

6. The process according to claim 1 wherein the mole ratio of isobutene to methylal is in the range of from about 2 to 20.

7. The process according to claim 6 wherein the mole ratio is from about 6 to 12.

8. The process according to claim 1 wherein additional $BF_3$ is introduced into the reaction zone after the reaction has been started up.

9. The process according to claim 1 wherein the reaction is carried out in the presence of a co-catalyst comprising $MgSO_4$, $BaSO_4$, $PbSO_4$ or $Cu(PO_4)_2$.

10. The process according to claim 9 wherein said co-catalyst is present in amounts of from about 1 to 25 weight percent based on the weight of the total catalyst mixture.

11. The process according to claim 10 wherein 2 to 8 weight percent of said co-catalyst is employed.

References Cited

UNITED STATES PATENTS

| 2,368,494 | 1/1945 | Rosen et al. | 260—681 |
| 3,024,292 | 3/1962 | Habeshaw et al. | 260—681 |
| 2,350,485 | 6/1944 | Arundale et al. | 260—681 |
| 2,561,483 | 7/1951 | Seon et al | 260—681 |
| 3,652,702 | 3/1972 | Hara | 260—681 |

DELBERT E. GANTZ, Primary Examiner

CHARLES E. SPRESSER, Jr., Assistant Examiner